(12) United States Patent
Varrassi

(10) Patent No.: US 10,006,697 B2
(45) Date of Patent: *Jun. 26, 2018

(54) STATION AND METHOD FOR SUPPLYING A FLAMMABLE FLUID FUEL

(71) Applicant: Cryolor, Ennery (FR)

(72) Inventor: Lucien Varrassi, Porcelette (FR)

(73) Assignee: Cryolor, Ennery (FR)

( * ) Notice: Subject to any disclaimer, the term of this patent is extended or adjusted under 35 U.S.C. 154(b) by 480 days.

This patent is subject to a terminal disclaimer.

(21) Appl. No.: 14/601,474

(22) Filed: Jan. 21, 2015

(65) Prior Publication Data
US 2015/0204604 A1    Jul. 23, 2015

(30) Foreign Application Priority Data

Jan. 21, 2014    (FR) ..................................... 14 50457

(51) Int. Cl.
*F17C 1/00*    (2006.01)
*F17C 3/00*    (2006.01)
(Continued)

(52) U.S. Cl.
CPC .............. *F25J 1/0025* (2013.01); *F17C 3/10* (2013.01); *F17C 7/02* (2013.01); *F17C 13/126* (2013.01);
(Continued)

(58) Field of Classification Search
CPC ...... F17C 2203/0375; F17C 2203/0379; F17C 2203/0383; F17C 2203/0391;
(Continued)

(56) References Cited

U.S. PATENT DOCUMENTS 3,374,639 A * 3/1968 Burke ................... F17C 13/126
62/240
3,986,340 A * 10/1976 Bivins, Jr. ................. F17C 9/02
122/33
(Continued)

FOREIGN PATENT DOCUMENTS

DE    199 03 214    8/2000
DE    20 2010 012886 U1    1/2011
(Continued)

OTHER PUBLICATIONS

French Search Report and Written Opinion for corresponding FR 1450456, dated Sep. 22, 2014.

*Primary Examiner* — Erik Mendoza-Wilkenfe
(74) *Attorney, Agent, or Firm* — Elwood L. Haynes

(57) ABSTRACT

Station for supplying a flammable fluid fuel comprising a first cryogenic tank (2) for storing fuel in the form of a cryogenic liquid, a second cryogenic tank (3) for storing an inert gas, a cooling circuit (4, 14) in a heat-exchange relationship with the first tank (2), the cooling circuit (4, 14) comprising an upstream end connected to the second cryogenic tank (3) for drawing cryogenic fluid from the second cryogenic tank (3) in order to give up frigories from the fluid of the second cryogenic tank (3) to the first tank (2), the station comprising a circuit (7) for withdrawing fluid derived from the second tank (3), characterized in that the cooling circuit comprises two pipes (4, 14) comprising an upstream end connected to the second tank (3), the two pipes (4, 14) each being provided with a respective exchanger (9, 10) housed in the first tank (2), the two exchangers (9, 10) being respectively situated in the upper and lower parts of the first tank.

9 Claims, 1 Drawing Sheet

(51) Int. Cl.
*F17C 7/02* (2006.01)
*F17C 13/00* (2006.01)
*F25J 1/00* (2006.01)
*F17C 3/10* (2006.01)
*F17C 13/12* (2006.01)

(52) U.S. Cl.
CPC ........... *F25J 1/0072* (2013.01); *F25J 1/0077* (2013.01); *F17C 2201/032* (2013.01); *F17C 2201/054* (2013.01); *F17C 2201/056* (2013.01); *F17C 2203/03* (2013.01); *F17C 2203/0629* (2013.01); *F17C 2205/013* (2013.01); *F17C 2205/0111* (2013.01); *F17C 2205/0169* (2013.01); *F17C 2221/012* (2013.01); *F17C 2221/033* (2013.01); *F17C 2223/0161* (2013.01); *F17C 2223/0169* (2013.01); *F17C 2223/033* (2013.01); *F17C 2227/0341* (2013.01); *F17C 2227/0372* (2013.01); *F17C 2227/0374* (2013.01); *F17C 2250/043* (2013.01); *F17C 2250/0439* (2013.01); *F17C 2260/038* (2013.01); *F17C 2260/042* (2013.01); *F17C 2265/03* (2013.01); *F17C 2265/031* (2013.01); *F17C 2265/034* (2013.01); *F17C 2265/035* (2013.01); *F17C 2265/05* (2013.01); *F17C 2265/065* (2013.01); *F17C 2270/0168* (2013.01); *Y02E 60/321* (2013.01)

(58) Field of Classification Search
CPC ...... F17C 2203/0626; F17C 2203/0629; F17C 2203/0631; F17C 2227/03; F17C 2227/00; F17C 2227/00367; F17C 2227/0369; F17C 2227/0372; F17C 2227/0374; F17C 2227/0395; F17C 2260/0372; F17C 2260/0374; F17C 2260/038; F17C 1/00; F17C 3/00; F17C 7/02; F25B 2500/222

See application file for complete search history.

(56) References Cited

U.S. PATENT DOCUMENTS

| | | | | |
|---|---|---|---|---|
| 4,292,062 | A * | 9/1981 | Dinulescu | B60K 15/013 62/240 |
| 5,121,609 | A * | 6/1992 | Cieslukowski | F17C 7/02 123/525 |
| 5,649,433 | A * | 7/1997 | Suzuki | F17C 3/08 165/166 |
| 6,336,332 | B1 * | 1/2002 | Cohu | F17C 9/02 62/48.4 |
| 2005/0000802 | A1 | 1/2005 | Hobbs | |
| 2005/0132719 | A1* | 6/2005 | Svensson | F17C 5/02 62/50.1 |

FOREIGN PATENT DOCUMENTS

| WO | WO 2013 190254 | 12/2013 |
|---|---|---|
| WO | WO 2014 086413 | 6/2014 |

\* cited by examiner

STATION AND METHOD FOR SUPPLYING A FLAMMABLE FLUID FUEL

CROSS REFERENCE TO RELATED APPLICATIONS

This application claims the benefit of priority under 35 U.S.C. § 119 (a) and (b) to French Patent Application No. 1450457 filed Jan. 21, 2014, the entire contents of which are incorporated herein by reference.

BACKGROUND

The present invention relates to a station for supplying a flammable fluid fuel and to a storage method.

SUMMARY

The invention relates more particularly to a station for supplying a flammable fluid fuel, the station comprising a first cryogenic tank for storing flammable fuel in the form of a cryogenic liquid, a second cryogenic tank for storing an inert gas stored in the form of a cryogenic liquid, a cooling circuit in a heat-exchange relationship with the first tank, the cooling circuit comprising an upstream end connected to the second cryogenic tank for drawing cryogenic fluid from the second cryogenic tank in order to give up frigories from the fluid of the second cryogenic tank to the first tank, the station comprising a circuit for withdrawing fluid from the second tank.

Storing a cryogenic liquid in an insulated tank under vacuum is prone to an increase in the internal pressure thereof. This is because if liquid is not regularly withdrawn, heat input from the tank supports, the piping and the insulation heat up the vacuum between the walls. Liquid vaporizes in the tank and as a result the pressure will increase until a safety valve opens.

Degassing of gases such as nitrogen, oxygen and argon does not present too much of a problem, but when the gas stored is a flammable gas (natural gas, hydrogen, etc.) such degassing carries the risk of creating an explosive cloud and therefore an "ATEX zone".

One known solution is to condense part of the gaseous phase in the tank or to cool the liquid in order to prevent it from vaporizing (cf. document DE19903214).

However, this solution does not permit precise control of the pressure or the temperature in the fuel tank.

Document DE202010012886U1 describes a liquefied natural gas tank cooled by, on the one hand, a first cooling circuit equipped with an exchanger housed in the tank and circulating a cooling fluid and, on the other hand, a circuit that injects cold fluid into a tank via an injection pipe equipped with nozzles for injecting re-liquefied natural gas.

It is an object of the present invention to alleviate all or some of the abovementioned disadvantages of the prior art.

To this end, the station according to the invention, in other respects in accordance with the generic definition given thereof in the above preamble, is essentially characterized in that the cooling circuit comprises two pipes comprising an upstream end connected to the second tank, the two pipes each being provided with a respective heat exchanger housed in the first tank, the two exchangers being respectively situated in the upper and lower parts of the first tank.

Moreover, embodiments of the invention may comprise one or more of the following features:

- the circuit for withdrawing fluid from the second tank is fluidically connected to the cooling circuit and fed with fluid derived therefrom,
- the first and second tanks are double-walled cryogenic tanks with a vacuum between the walls,
- the first and second tanks are housed in a common outer shell under vacuum,
- the second tank is positioned above the first tank,
- the first tank contains a fuel out of: natural gas, hydrogen,
- the second tank contains a gas out of: nitrogen, argon,
- the withdrawing circuit comprises a stack provided with a check valve that forms a vent if a determined overpressure is reached within the said circuit,
- the station comprises at least a detector of fuel leaks from the first tank and at least a controlled member for opening a portion of the withdrawing circuit, the at least one opening member being controlled automatically in response to a detection of a leak by the at least one detector in order to release fluid derived from the second cryogenic tank so as to inert a volume within the station,
- the leak detector comprises at least one out of: a fuel sensor, a catalytic probe, a chemical sensor, a sensor of an optical type,
- the at least one opening member comprises at least one out of: a cock, a valve, a spray nozzle,
- the at least one opening member is spaced away from the first tank by a distance comprised between zero and five meters and preferably between zero and two meters,
- the station contains a control cabinet that groups together the functional control members of the station, the at least one opening member comprising an end that opens at least in part into the said cabinet,
- the station comprises two distinct opening members spaced apart,
- the station comprises two opening members respectively situated on two distinct portions of the withdrawing circuit and respectively connected to the two distinct pipes of the cooling circuit which are provided with the exchangers.

The invention also relates to a method for storing a flammable fluid fuel in a filling station comprising a first cryogenic tank storing flammable fuel in the form of a cryogenic liquid, a second cryogenic tank storing an inert gas at a temperature lower than the temperature of the fluid contained in the first tank, the station comprising a cooling circuit in a heat-exchange relationship with the first tank, the cooling circuit having an upstream end connected to the second cryogenic tank, the method comprising a step of withdrawing cryogenic fluid from the second cryogenic tank, a step of exchanging heat between this withdrawn fluid and the fluid contained in the second cryogenic tank in order to reduce or eliminate the vaporization of the fluid in the first tank, the method comprising a step of controlling the pressure and/or the temperature in the first tank by distributing the fluid withdrawn from the second tank between exchangers positioned respectively in the top and bottom parts of the first tank.

According to other possible features:
- the fluids withdrawn from the second tank and distributed between the two exchangers situated in the top and bottom parts are distinct, which means to say that the fluid circulating through one of the two exchangers comes directly from the second tank without passing through the other exchanger beforehand.

The invention may also relate to any alternative method or device comprising any combination of the features listed above or below.

BRIEF DESCRIPTION OF THE DRAWINGS

Other specifics and advantages will become apparent from reading the description hereinafter which is given with reference to the figures in which.

DESCRIPTION OF PREFERRED EMBODIMENTS

Figure 1:
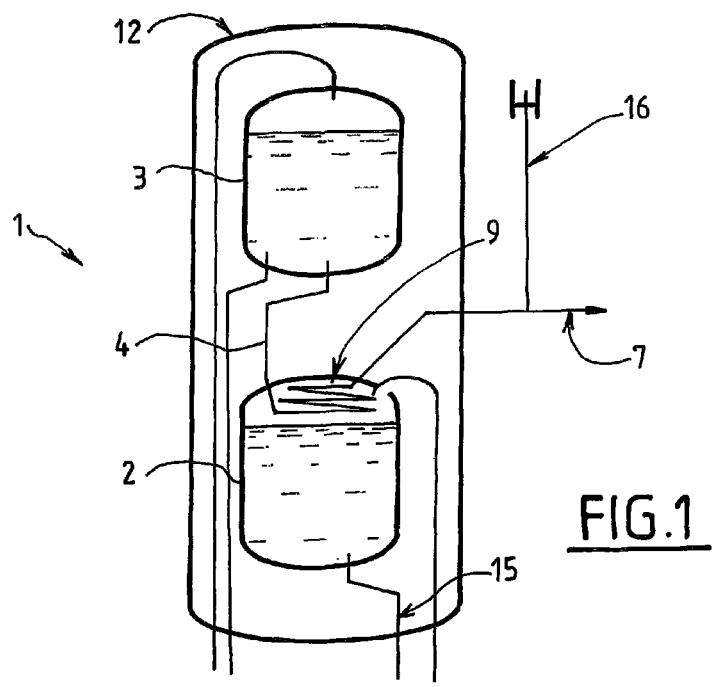
FIG. 1 depicts a schematic and partial view in cross section illustrating a first embodiment of a station for supplying fuel according to the invention.

The station 1 illustrated in FIG. 1 is a station for supplying a flammable fluid fuel, for example natural gas, from a first cryogenic tank 2 storing the flammable fuel in the form of a cryogenic liquid (for example at −140° C.). More specifically, the first tank 2 contains a biphasic liquid/gas mixture.

The station 1 comprises a second cryogenic tank 3 for storing a non-flammable gas and notably an inert gas such as nitrogen stored at a temperature of −196° C.

The inert gas is also stored in the form of a cryogenic liquid (biphasic liquid/gas mixture).

The first 2 and second 3 tanks are preferably double-walled cryogenic tanks with a vacuum between the walls.

The station 1 comprises a circuit 15 for withdrawing fluid from the first tank 3. This circuit 15 comprises for example a pipe for supplying liquid fuel to a user, for example for filling vehicle tanks or volumes. Alternatively or in combination, the liquid withdrawn may be supplied to a vaporization unit in order to feed a user with gas.

The station 1 comprises a cooling circuit 4 in a heat-exchange relationship with the first tank 2 and notably with the fluid inside the first tank 2. The cooling circuit 4 comprises two pipes having an upstream end connected to the second cryogenic tank 3 in order to draw cryogenic fluid from the second cryogenic tank 3.

In the example illustrated, the two pipes 4, 14 have distinct upstream ends (connected to the second tank 3). Of course, it is possible to conceive of a common end for connection to the second tank 3.

The two pipes 4, 14 of the cooling circuit 4 each comprise, downstream, a portion 9, 10 in a heat-exchange relationship with the inside of the first tank 2 so as to give up frigories from the fluid of the second cryogenic tank 3 to the first tank 2. These heat-exchange portions 9 comprise for example a coil, a condenser or any other suitable type of exchanger.

In addition, the two exchangers 9, 10 housed inside the first tank 2 are respectively situated in the upper and lower part of the first tank 2 so as respectively to cool the gaseous and liquid parts of the fuel.

This arrangement allows the cooling fluid derived from the second tank 3 to be distributed between the first 9 and/or second 10 exchanger so as selectively to cool the gaseous part and/or the liquid part of the fluid of the first tank 2. Control of the pressure and of the cooling of this fluid fuel is thus improved.

Downstream of each exchanger 9, 10, each cooling pipe 4, 14 may comprise a pipe 7 supplying heated-up cooling fluid to a user (in gaseous and/or liquid form).

Thus, the downstream part 7 of the cooling circuit may form a circuit for withdrawing fluid from the second tank 3. What that means is that the withdrawing circuit 7 is connected to the cooling circuit 4 and fed with inert fluid derived therefrom.

The withdrawing circuit 37 may notably comprise one or more downstream distribution ends fed with fluid directly from the second tank 3 or via one or both pipes 4, 14 of the cooling circuit.

What that means is that the withdrawing circuit 7 may possess a pipe fed with fluid derived from the second tank 3 via one of the pipes 4, 14 of the cooling circuit. The withdrawing circuit 7 may possess a distinct second pipe fed with fluid derived from the second tank 3 via the other pipe 14, 4 of the cooling circuit.

What that means to say is that the pipe or pipes of the withdrawing circuit 7 are fed with fluid initially derived from the second tank 3, after the fluid has passed through the cooling circuit (through one or both pipes 4, 14 equipped with a heat exchanger housed in the first tank 2).

The withdrawing circuit may notably comprise a pipe comprising a downstream distribution end connected upstream to one or both pipes 4, 14 of the cooling circuit.

This withdrawing circuit 7 may comprise a stack 16 provided with a check valve that forms a vent if a determined overpressure is reached.

Figure 2:
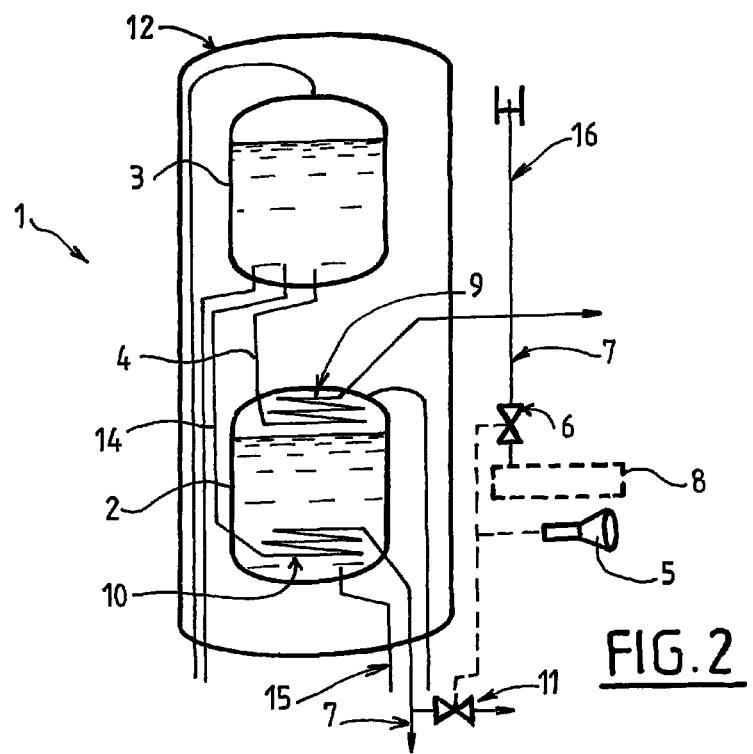
FIG. 2 depicts a schematic and partial view in cross section illustrating a second embodiment of a station for supplying fuel according to the invention.

FIG. 2 illustrates one possible alternative form of embodiment of the invention that differs from that of FIG. 1 only in that the station comprises a leak detection and fire protection system.

Elements identical to those described previously are denoted by the same numerical references and are not described a second time.

Thus, in the embodiment of FIG. 2, the station 1 comprises a detector 5 that detects leaks of fuel from the first tank 2. The leak detector 5 comprises for example at least one out of: a fuel sensor (notably a natural gas sensor), a catalytic probe, a chemical sensor, a sensor of an optical type, or any other appropriate system.

In addition, the station comprises two controlled members 6, 11 for opening a portion of the cooling/withdrawing circuit 4, 7. The two distinct opening members 6, 11 are preferably spaced apart and fed respectively by the two pipes 4, 14. The two opening members 6 are controlled automatically in response to the detection of a leak by the detector 5 in order to release fluid derived from the second cryogenic tank 3 so as to inert a volume within the station.

The opening members 6, 11 may comprise at least one out of: a cock, a valve, a spray nozzle or any other suitable device allowing inert gas to be released into a determined zone in response to the detection of a fuel leak.

For example, at least one of the opening members 6, 11 is spaced away from the first tank 2 by a distance comprised between zero and five meters and preferably between zero and two meters, so as to inert the zone directly adjacent to the first tank 2. As an alternative, the one of the opening members 6, 11 is situated some distance away, in order to inert a more remote zone, for example between two and ten meters away if the leak is likely to occur there and constitutes an at-risk zone. The two opening members 6, 11 may thus open into distinct or common zones of the station.

If the station comprises a control cabinet 8 grouping together the functional control members of the station (electronic control valves, displays, etc), the at least one of the opening members 6, 11 may have an end opening at least in part into the said cabinet 8 so as to protect it against fire.

As illustrated in the figures and without thereby implying any limitation, and advantageously although not essentially, the shells delimiting the storage volumes of the first 2 and second 3 tanks may be housed in a common external shell 12 under vacuum. What that means is that the first 2 and second 3 insulated tanks under vacuum containing respective fluids at distinct temperatures share the same external shell and the same vacuum between the walls.

Of course, the invention is not restricted to the examples hereinabove; for example, the station may have just one opening member or may have three or more than three opening members.

It will therefore be readily appreciated that while being of a simple and inexpensive structure, the station 1 allows the fuel tank cooling fluid to be used to good effect to keep the station safe in the event of a fuel leak. The station may be fixed or mobile (mounted on a trailer or a vehicle).

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. A station for supplying a flammable fluid fuel, the station comprising a first cryogenic tank for storing flammable fuel in the form of a cryogenic liquid, a second cryogenic tank for storing an inert gas stored in the form of a cryogenic liquid, a cooling circuit comprising a first heat exchanger and a second heat exchanger, each in a heat-exchange relationship with the first tank, the cooling circuit comprising at least one upstream end connected to the second cryogenic tank for drawing cryogenic fluid from the second cryogenic tank in order to give up frigories from the fluid of the second cryogenic tank to the first tank, the station comprising a circuit for withdrawing fluid derived from the second tank, wherein the cooling circuit comprises a first pipe and a second pipe, each comprising an upstream end connected to the second tank, the first pipe and the second pipe being connected to the first heat exchanger and the second heat exchanger, respectively, housed in the first tank, the first heat exchanger and the second heat exchanger being respectively situated in the upper and lower parts of the first tank.

2. The station of claim 1, wherein the circuit for withdrawing fluid from the second tank is fluidically connected to the cooling circuit and fed with fluid derived therefrom.

3. The station of claim 1, wherein the first and second tanks are double-walled cryogenic tanks with a vacuum between the walls.

4. The station of claim 3, wherein the first and second tanks are housed in a common outer shell under vacuum.

5. The station of claim 1, wherein the second tank is positioned above the first tank.

6. The station of claim 1, wherein the first tank contains a fuel selected from the group consisting of natural gas, and hydrogen.

7. The station of claim 1, wherein the second tank contains a gas out of nitrogen, argon.

8. The station of claim 1, wherein the circuit for withdrawing fluid derived from the second tank comprises at least part of the cooling circuit and notably one of the pipes equipped with a heat exchanger, which means that the withdrawing circuit is fed with fluid by the said pipe of the cooling circuit.

9. The station of claim 1, wherein the withdrawing circuit comprises a stack provided with a check valve that forms a vent if a determined overpressure is reached within the said circuit.

* * * * *